(12) United States Patent
Liu et al.

(10) Patent No.: US 10,362,331 B2
(45) Date of Patent: Jul. 23, 2019

(54) METHOD AND APPARATUS FOR INTRABC MODE WITH FRACTIONAL-PEL BLOCK VECTOR RESOLUTION IN VIDEO CODING

(71) Applicant: HFI Innovation Inc., Zhubei, Hsinchu County (TW)

(72) Inventors: Shan Liu, San Jose, CA (US); Xiaozhong Xu, State College, PA (US)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 95 days.

(21) Appl. No.: 15/554,280

(22) PCT Filed: Mar. 2, 2016

(86) PCT No.: PCT/CN2016/075279
§ 371 (c)(1),
(2) Date: Aug. 29, 2017

(87) PCT Pub. No.: WO2016/138854
PCT Pub. Date: Sep. 9, 2016

(65) Prior Publication Data
US 2018/0048909 A1    Feb. 15, 2018

Related U.S. Application Data

(60) Provisional application No. 62/154,373, filed on Apr. 29, 2015, provisional application No. 62/126,983, filed on Mar. 2, 2015.

(51) Int. Cl.
*H04N 19/523* (2014.01)
*H04N 19/593* (2014.01)
(Continued)

(52) U.S. Cl.
CPC ......... *H04N 19/523* (2014.11); *H04N 19/105* (2014.11); *H04N 19/139* (2014.11);
(Continued)

(58) Field of Classification Search
CPC .. H04N 19/523; H04N 19/105; H04N 19/139; H04N 19/159; H04N 19/172; H04N 19/593
See application file for complete search history.

(56) References Cited

U.S. PATENT DOCUMENTS

| | | | |
|---|---|---|---|
| 10,015,515 B2* | 7/2018 | Guo | H04N 19/52 |
| 2014/0301465 A1 | 10/2014 | Kwon et al. | |
| 2014/0376634 A1* | 12/2014 | Guo | H04N 19/52 375/240.16 |

OTHER PUBLICATIONS

International Search Report dated May 27, 2016, issued in application No. PCT/CN2016/075279.
(Continued)

*Primary Examiner* — Maria E Vazquez Colon
(74) *Attorney, Agent, or Firm* — McClure, Qualey & Rodack, LLP

(57) ABSTRACT

A method and apparatus of video coding using IntraBC (Intra Block Copy) mode are disclosed. The system derives a block vector pointing from the current block to a reference block within a reconstructed pixel area of the current picture. If the block vector is at the fractional-pel resolution, the block vector is restricted so that neighboring pixels at integer-pel locations around fractional-pel reference pixels of the reference block for generating the fractional-pel reference pixels of the reference block using an interpolation filter are all available within the reconstructed pixel area. In another embodiment, the unavailable reference pixels for interpolation to generate fractional-pel reference pixels are padded.

5 Claims, 5 Drawing Sheets

(51) Int. Cl.
H04N 19/105 (2014.01)
H04N 19/139 (2014.01)
H04N 19/159 (2014.01)
H04N 19/172 (2014.01)

(52) U.S. Cl.
CPC ......... H04N 19/159 (2014.11); H04N 19/172 (2014.11); H04N 19/593 (2014.11)

(56) References Cited

OTHER PUBLICATIONS

Joshi, R., et al.; "Screen content coding test model 3 (SCM 3);" Joint Collaborative Team on Video Coding (JCT-VC) of ITU-T SG 16 WP 3 and ISO/IEC JTC 1/SC 29/WG 11; 19th Meeting: Strasbourg, FR; Document: JCTVC-S1014; Oct. 2014; pp. 1-12.

Lee, S., et al.; "RCE3: Subtest C.4—Padding-based generation of unavailable samples in intra block copy;" Joint Collaborative Team on Video Coding (JCT-VC) of ITU-T SG 16 WP 3 and ISO/IEC JTC 1/SC 29/WG 11; 16th Meeting: San José, US; Document: JCTVC-P0053; Jan. 2014; pp. 1-5.

Alshina, E., et al.; "AhG5: Intra block copy within one LCU;" Joint Collaborative Team on Video Coding (JCT-VC) of ITU-T SG 16 WP 3 and ISO/IEC JTC 1/SC 29/ WG 11; Oct.-Nov. 2013; pp. 1-7.

* cited by examiner

METHOD AND APPARATUS FOR INTRABC MODE WITH FRACTIONAL-PEL BLOCK VECTOR RESOLUTION IN VIDEO CODING

CROSS REFERENCE TO RELATED APPLICATIONS

The present invention claims priority to U.S. Provisional Patent Application, Ser. No. 62/126,983, filed on Mar. 2, 2015 and U.S. Provisional Patent Application, Ser. No. 62/154,373, filed on Apr. 29, 2015. The U.S. Provisional Patent Applications are hereby incorporated by reference in their entireties.

FIELD OF THE INVENTION

The present invention relates to video coding system with unified motion vector for Inter prediction and block vector for IntraBC (Intra Block Copy) mode. In particular, the present invention relates to handling of unavailable reference pixels when a block vector is at fractional-pel resolution.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include screen content coding (SCC). Due to specific characteristics of screen contents, coding tools have been developed and demonstrate significant gains in coding efficiency. Among them, the color index coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the color index coding becomes very effective for screen content materials. Related key color index coding techniques are briefly reviewed as follows.

During the Course of Screen Content Coding (SCC) development, various video coding tools have been described, including the "Intra picture block copy" (IntraBC) technique. The IntraBC technique was first disclosed in JCTVC-M0350 (Budagavi et al., *AHG8. Video coding using Intra motion compensation*, Joint Collaborative Team on Video Coding (JCT-VC) of ITU-T SG16 WP3 and ISO/IEC JTC 1/SC 29/WG11 13th Meeting: Incheon, KR, 18-26 Apr. 2013, Document: JCTVC-M0350). An example according to JCTVC-M0350 is shown in FIG. 1, where a current coding unit (CU, 110) is coded using Intra MC (motion compensation). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named motion vector (MV) or block vector (BV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process.

In JCTVC-M0350, the IntraBC is different from the motion compensation used for Inter prediction in at least the following areas:
  BVs are restricted to be 1-D for IntraBC (i.e., either horizontal or vertical) while Inter prediction uses 2-D motion estimation.
  Binarization is fixed length for IntraBC while Inter prediction uses exponential-Golomb.
  IntraBC introduces a new syntax element to signal whether the BV is horizontal or vertical.

Based on JCTVC-M0350, some modifications are disclosed by Pang, et al., in *Non-RCE3: Intra Motion Compensation with 2-D MVs*, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256 (hereinafter JCTVC-N0256). Firstly, the IntraBC is extended to support 2-D MVs, so that both vertical and horizontal MV components can be non-zero at the same time. This provides more flexibility to IntraBC than the original approach, where the MV is restricted to be strictly horizontal or vertical.

In JCTVC-N0256, two BV coding methods are disclosed:
  Method 1—Block vector prediction. The left or above BV is selected as the BV predictor and the resulting motion vector difference (BVD) is coded. A flag is used to indicate whether the BVD is zero. When BVD is not zero, exponential-Golomb codes of the 3rd order are used to code the remaining absolute level of the BVD. Another flag is used to code the sign.
  Method 2: No block vector prediction. The BV is coded using the exponential-Golomb codes that are used for BVD in HEVC.

Another difference disclosed in JCTVC-N0256 is that the 2-D IntraBC is further combined with the pipeline friendly approach:
  1. No interpolation filters are used.
  2. BV search area is restricted. Two cases are disclosed:
    a. Search area is the current CTU and the left CTU or
    b. Search area is the current CTU and the rightmost 4 column samples of the left CTU.

Among the proposed methods in JCTVC-N0256, the 2-D IntraBC, the removal of interpolation filters, and the search area constraint to the current CTU and the left CTU have been adopted in a draft HEVC SCC standard.

A valid block vector should point to the already reconstructed area of the current picture, and should be outside the current CU. In addition, in SCM-3.0 (Joshi, et al., *Screen content coding test model 3* (*SCM* 3), Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S1014), a ladder shape IntraBC search range constraint is adopted, as shown in FIG. 2, which is initially intended for Wavefront Parallel processing (WPP). However, it is used for HEVC SCC regardless whether it is for WPP or not. In FIG. 2, each square represents a CTU. For an IntraBC block in current CTU, its available search area is constrained to the dot-filled CTUs and the reconstructed blocks in the current CTU.

Therefore, for a IntraBC coded block, its block vector BV=(BV_x, BV_y) should satisfies the following bitstream conformance conditions:

$$BV\_x + nPbSw + xPb - xCb \leq 0 \text{ or}$$

$$BV\_y + nPbSh + yPb - yCb \leq 0 \quad (1)$$

$$(xPb+BV\_x+nPbSw-1)/CtbSize-xCb/CtbSize \leq yCb/CtbSize-(yPb+BV\_y+nPbSh-1)/CtbSize \quad (2)$$

In the above equations, nPbSw and nPbSh are the width and height of the current PU; (xPb, yPb) is the location of the top-left pixel of the current PU relative to the current picture; (xCb, yCb) is the location of the top-left pixel of the current CU relative to the current picture; and CtbSize is the size of the CTU block. When both equations (1) and (2) are satisfied, the reference block pointed by the block vector will be fully within the available search area for the current block.

IntraBC as an Inter Coding Mode

In a recent coding standard meeting, the IntraBC is unified with Inter coding mode (Pang, et al., *Non-CE2 Test 1: Intra block copy and inter signalling unification*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0227). In other words, the current picture is treated as a reference picture and inserted into one or both reference picture lists. Block vector prediction and coding are the same as inter motion vector prediction and coding. This unification simplifies the codec design. However, there are some remaining issues. For IntraBC, the block vector has integer resolution. However, the motion vector has both integer and quarter-pel resolutions switched at a slice level. When a block vector is treated at quart-pel resolution, some extra rows and columns of pixels around the block, which is pointed to by this block vector, need to be interpolated. These pixels may not be available in the current IntraBC-Inter unification scheme.

In high level syntax, coded data for the current picture is placed in the bitstream after all short term reference pictures and all other long term reference pictures during the initialization of reference picture list construction. Exemplary pseudo codes for the related reference picture processing are shown below for List 0. At the beginning of the decoding process for each slice, the reference picture lists RefPicList0 and, for B slices, RefPicList1 are derived.

The variable NumRpsCurrTempList0 is set equal to Max (num_ref_idx_l0_active_minus1+1, NumPicTotalCurr) and the list RefPicListTemp0 is constructed as shown in Table 1.

```
for( rIdx = 0; rIdx <= num_ref_idx_l0_active_minus1; rIdx++)
    RefPicList0[ rIdx ] = ref_pic_list_modification_flag_l0 ?
        RefPicListTemp0[ list_entry_l0[ rIdx ] ] : RefPicListTemp0[ rIdx ]
```

However, when num_ref_idx_l0_active_minus1 is smaller than the index of the entry, in which the RefPicListTemp0 array stores the current picture, the current picture may not be included in the reference picture list. Therefore, it is desirable to develop techniques to overcome these issues.

BRIEF SUMMARY OF THE INVENTION

A method and apparatus of video coding using IntraBC (Intra Block Copy) mode are disclosed. In one embodiment, the system derives a block vector pointing from the current block to a reference block within a reconstructed pixel area of the current picture. If fractional-pel resolution is enabled for the current block and the block vector is at the fractional-pel resolution, the block vector is restricted to cause neighboring pixels at integer-pel locations around fractional-pel reference pixels of the reference block for generating the fractional-pel reference pixels of the reference block to be all available within the reconstructed pixel area. The fractional-pel reference pixels of the reference block can be generated from the neighboring pixels at integer-pel locations using an interpolation filter with 2L filter tap length, where L is a positive integer. L can be equal to 4 for a luma block and L can be equal to 2 for a chroma block. In one embodiment, restricting the block vector shifts boundaries of the neighboring pixels at integer-pel locations available for generating the fractional-pel reference pixels of the reference block upward by at least (L−1) pixels and leftward by at least (L−1) pixels from boundaries of the reconstructed pixel area.

Whether the neighboring pixels at integer-pel locations around fractional-pel reference pixels of the reference block for generating the fractional-pel reference pixels of the reference block are all available within the reconstructed pixel area can be determined according to if one or more conditions associated with the block vector and one or more coding parameters are satisfied.

In another embodiment, the current block comprises a luma block and a chroma block for non-4:4:4 color video data, a luma block vector associated with the luma block is always at integer-pel resolution and a chroma block vector associated with the chroma block is scaled from the luma block vector, the block vector restriction is applied to the chroma block vector if the chroma block vector is at the fractional-pel resolution. In yet another embodiment, the

TABLE 1

```
rIdx = 0
while( rIdx < NumRpsCurrTempList0 ) {
    for( i = 0; i < NumPocStCurrBefore && rIdx < NumRpsCurrTempList0; rIdx++, i++ )
        RefPicListTemp0[ rIdx ] = RefPicSetStCurrBefore[ i ]
    for( i = 0; i < NumPocStCurrAfter && rIdx < NumRpsCurrTempList0; rIdx++, i++ )
        RefPicListTemp0[ rIdx ] = RefPicSetStCurrAfter[ i ]
    for( i = 0; i < NumPocLtCurr && rIdx < NumRpsCurrTempList0; rIdx++, i++ )
        RefPicListTemp0[ rIdx ] = RefPicSetLtCurr[ i ]
    if( curr_pic_as_ref_enabled_flag )
        RefPicListTemp0[ rIdx++ ] = currPic
}
```

After the initialization, the reference picture list (i.e., RefPicList0) construction is performed in exemplary pseudo codes shown as follows:

current block corresponds to a luma block and the block vector restriction is applied to the luma block vector if the block vector is at the fractional-pel resolution.

In another embodiment, the unavailable reference pixels are padded for interpolation associated with fractional-pel resolution. The unavailable filter input data can be padded by extending rightmost available column of the reference block horizontally and extending bottommost available row of the reference block vertically. The horizontal extension can be performed first. Alternatively, the vertical extension can be performed first. The unavailable filter input data can be padded using a default or pre-set value. For example, the default or pre-set value may correspond to zero or ((1<<bit_depth)>>1), where bit_depth corresponds to pixel data bit depth of the current picture.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Block Vector Constraint for Interpolation

Figure 1:
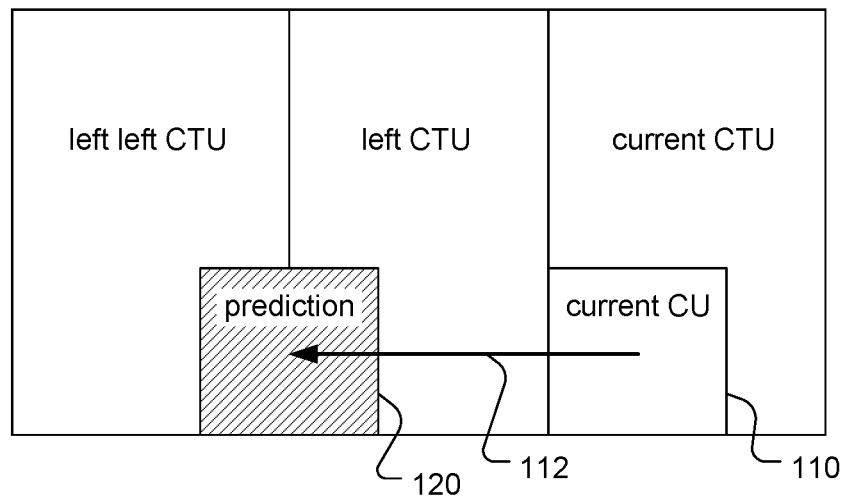
FIG. 1 illustrates an example of Intra Block Copy (IntraBC) coding used for screen content coding (SCC).
Figure 2:
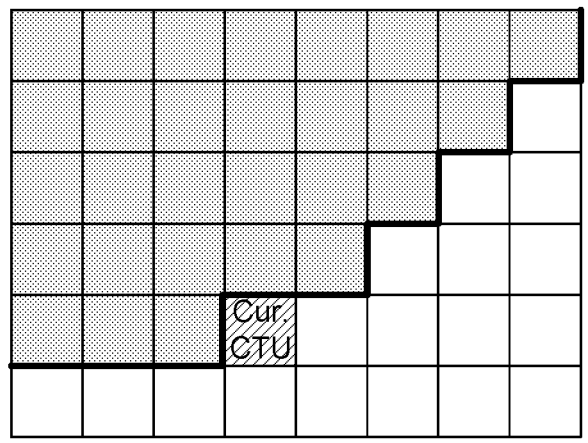
FIG. 2 illustrates an example of ladder-shaped reconstructed areas available for reference pixels in the IntraBC (Intra Block Copy) mode.
Figure 3:
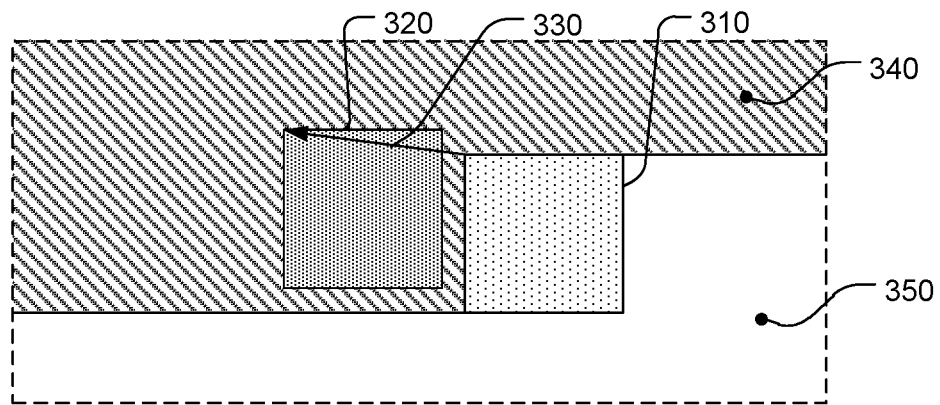
FIG. 3 illustrates an example of IntraBC reference block in the available reconstructed area, where an integer block vector is assumed.

One aspect of the present invention addresses issues related to block vector interpolation. For a current block using IntraBC mode, if the block vector (i.e. motion vector pointing to reference areas inside the current picture) is at an integer position, the pixels in the available reference block and outside the current CU meeting the bitstream conformance conditions specified in equations (1) and (2) can be used for reference. FIG. 3 illustrates an example of IntraBC reference block from available reconstructed area, where an integer block vector is assumed. The block vector 330 points from the current block 310 to the reference block 320. The line-filled area 340 represents the available reference area and the white area 350 represents the unavailable reference area.

When a block vector points to a fractional pixel (i.e., sub-pel) position, the reference block may not be fully available for interpolation even if the bitstream conformance conditions (1) and (2) are satisfied. If a reference block is at a sub-pel position, the pixel value at each fractional pixel in the reference block has to be interpolated from neighboring existing pixels. Therefore, some other neighboring integer pixels besides the nearest integer pixels may also be required for interpolation. In general, a symmetric interpolation filter is often used. If the filter has filter tap length equal to 2L, it requires L integer pixels at each side of a sub-pel position available for interpolating this sub-pel position. In HEVC, L=4 for luma pixels and L=2 for chroma pixels. Sometimes, these neighbors may not be available for cases such as the reference block near the boundary of the available reference area.

Figure 4:
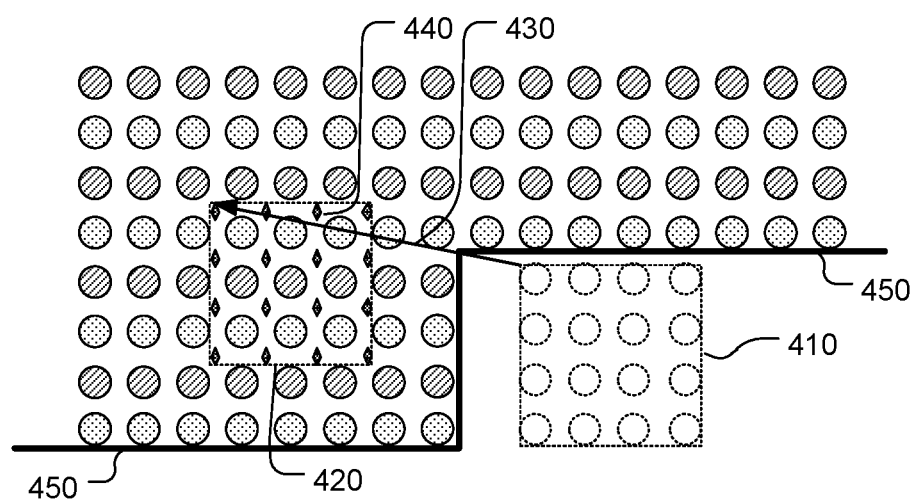
FIG. 4 illustrates an example of unavailable reference pixels for fractional-pel block vector, where surrounding neighboring reconstructed pixels around the right and bottom sides of the reference block are not enough for interpolation.

FIG. 4 illustrates an example of unavailable reference pixels for fractional-pel block vector, where surrounding neighboring reconstructed pixels around the right and bottom sides of the reference block are not enough for interpolation. The block vector 430 pointing from the current block 410 to the reference block 420 is at fractional-pel resolution. The fractional-pel reference data within the reference block 420 need to be generated by interpolation. The fraction-pel locations within the reference block are indicated by small diamond-shaped symbols 440. The area above the thick boundary 450 represents the available reference area and the area below the thick boundary 450 represents the unavailable reference area. The reference block is close to the boundary of available reference area (i.e, 2 pixels to the right and 2 pixels below). Since 4 neighboring pixels on each side of the current pixel are needed for L=4, the two pixel columns on the right hand side and only two pixel rows on the bottom are not enough for the interpolation operation. Accordingly, a method to constrain the block vector to ensure that all pixel data for interpolation is available.

Method 1. Constraining the Block Vector

According to this method, a constraint is imposed on the block vector such that it can only point to a reference block that has enough available reconstructed reference area around the boundary for interpolation. In particular, L columns to the right boundary and L rows below the bottom boundary in the available reconstructed reference area should be available for interpolating the fractional-pel locations of the reference block. As mentioned before, 2L is the length of the interpolation filter.

Embodiment 1. According to this embodiment, the block vector (BV_x, BV_y) is restricted by modifying the bitstream conformance conditions (1) and (2) as shown in equations (3) and (4):

$$BV\_x + nPbSw + xPb - xCb + (L-1) <= 0 \text{ or}$$

$$BV\_y + nPbSh + yPb - yCb + (L-1) <= 0 \quad (3)$$

$$(xPb+BV\_x+nPbSw-1+(L-1))/CtbSize-xCb/\\CtbSize <= yCb/CtbSize-(yPb+BV\_y+nPbSh-1+\\(L-1))/CtbSize \quad (4)$$

In the above equations, the interpolation filter length is 2L, CtbSize is the luma CTU block size. These two constraints (3) and (4) should be applied to the block vector. The interpolation filter length (i.e. L) on each side of the pixel position to be interpolated can be the same as that in the existing HEVC SCC draft standard.

Compared to the bitstream conformance conditions (1) and (2), the available reference pixel boundaries according to the above embodiment are shifted by (L−1) pixels in the vertical direction and shifted by (L−1) pixels in the horizontal direction.

Embodiment 2. According to this embodiment, the block vector (BV_x, BV_y) is restricted by modifying the bitstream conformance conditions (1) and (2) as shown in equations (5) and (6):

$$BV\_x+nPbSw+xPb-xCb+L<=0 \text{ or}$$

$$BV\_y+nPbSh+yPb-yCb+L<=0 \quad (5)$$

$$(xPb+BV\_x+nPbSw-1+L)/CtbSize-xCb/CtbSize<=yCb/CtbSize-(yPb+BV\_y+nPbSh-1+L)/CtbSize \quad (6)$$

Compared to the bitstream conformance conditions (1) and (2), the available reference pixel boundaries according to the above embodiment are shifted by L pixels in the vertical direction and shifted by L pixels in the horizontal direction.

Embodiment 3. According to this embodiment, the block vector (BV_x, BV_y) is restricted by modifying the bitstream conformance conditions (1) and (2) as shown in equations (7) and (8), where m is a positive integer.

$$BV\_x+nPbSw+xPb-xCb+(L+m)<=0 \text{ or}$$

$$BV\_y+nPbSh+yPb-yCb+(L+m)<=0 \quad (7)$$

$$(xPb+BV\_x+nPbSw-1+(L+m))/CtbSize-xCb/CtbSize<=yCb/CtbSize-(yPb+BV\_y+nPbSh-1+(L+m))/CtbSize \quad (8)$$

Compared to the bitstream conformance conditions (1) and (2), the available reference pixel boundaries according to the above embodiment are shifted by (L+m) pixels in the vertical direction and shifted by (L+m) pixels in the horizontal direction, where m is an integer having positive value, negative value or zero.

When the block vectors always choose integer resolution, the luma pixels do not need interpolation. However, for chroma pixels in non-4:4:4 color formats, the chroma block vector is derived by scaling the luma block vector. The chroma block vector after scaling may point to sub-pel positions and interpolation is needed.

Embodiment 4. According to this embodiment, the block vector (BV_x, BV_y) is restricted by modifying the following bitstream conformance conditions (1) and (2) as shown in equations (9) and (10):

$$BV\_x+nPbSw+xPb-xCb+(L-1)*2*(\text{subWidthC}-1)<=0 \text{ or}$$

$$BV\_y+nPbSh+yPb-yCb+(L-1)*2*(\text{subHeightC}-1)<=0 \quad (9)$$

$$(xPb+BV\_x+nPbSw-1+(L-1)*2*(\text{subWidthC}-1))/CtbSize-xCb/CtbSize \; yCb/CtbSize-(yPb+BV\_y+nPbSh-1+(L-1)*2*(\text{subHeightC}-1))/CtbSize \quad (10)$$

In the above equations, subHeightC and subWidthC are variables related to chroma format as defined in HEVC SCC. The subWidthC and subHeightC values are derived from chroma_format_idc and separate_colour_plane_flag as shown in Table 2. The interpolation filter length (i.e. L) on each side of the pixel position to be interpolated can be the same as that in the existing HEVC SCC draft standard.

TABLE 2

| chroma_for-mat_idc | separate_col-our_plane_flag | Chroma format | sub-WidthC | sub-HeightC |
| --- | --- | --- | --- | --- |
| 0 | 0 | mono-chrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

Embodiment 5. According to this embodiment, the block vector (BV_x, BV_y) is restricted by modifying the following bitstream conformance conditions (1) and (2) as shown in equations (11) and (12):

$$BV\_x+nPbSw+xPb-xCb+L*2*(\text{subWidthC}-1)<=0 \text{ or}$$

$$BV\_y+nPbSh+yPb-yCb+L*2*(\text{subHeightC}-1)<=0 \quad (11)$$

$$(xPb+BV\_x+nPbSw-1+L*2*(\text{subWidthC}-1))/CtbSize-xCb/CtbSize<=yCb/CtbSize-(yPb+BV\_y+nPbSh-1+L*2*(\text{subHeightC}-1))/CtbSize \quad (12)$$

Embodiment 6. According to the sixth embodiment, the block vector (BV_x, BV_y) is restricted by modifying the following bitstream conformance conditions (1) and (2) as shown in equations (13) and (14):

$$BV\_x+nPbSw+xPb-xCb+(L+m)*2*(\text{subWidthC}-1)<=0 \text{ or}$$

$$BV\_y+nPbSh+yPb-yCb+(L+m)*2*(\text{subHeightC}-1)<=0 \quad (13)$$

$$(xPb+BV\_x+nPbSw-1+(L+m)*2*(\text{subWidthC}-1))/CtbSize-xCb/CtbSize<=yCb/CtbSize-(yPb+BV\_y+nPbSh-1+(L+m)*2*(\text{subHeightC}-1))/CtbSize \quad (14)$$

In the above embodiments, the bitstream conformance conditions are modified as long as fractional-pel block vectors are enabled. In other words, the bitstream conformance conditions are modified regardless whether the block vector points to an integer position or a fractional-pel position. A variation to the above embodiments applies the bitstream conformance conditions modification only when the block vector points to a sub-pel position. If the block vector has fractional pixel resolution, but actually points to an integer position (i.e., fractional part equal to 0), the above bitstream conformance conditions modification is not necessary.

Method 2. Padding the Unavailable Pixels with Neighboring Available Pixels

According to this method, the unavailable pixels are padded using the neighboring available pixels in the reference area. In particular, the rightmost column of the available pixels in the reference block is extended horizontally to pad the right hand side neighboring pixels. These unavailable pixels are required for interpolating some sub-pixels. Similarly, the very bottom row of the available pixels in the reference block is extended vertically to pad the bottom side neighboring pixels. These unavailable pixels are required for interpolating some sub-pixels. For the sub-pel positions in the bottom-right corner of the reference block, there are a total of L pixels on the right hand side or below the bottom-right corner needed for interpolation. Let M(x) be the number of integer pixels available on the right hand side and M(y) be the number of integer pixels available below it. If M(x)<L, there are (L-M(x)) unavailable columns need to be filled. If M(y)<L, there are (L-M(y)) unavailable rows need to be filled. In one embodiment, horizontal padding is done first, followed by vertical padding. In another embodiment, vertical padding is done first, followed by horizontal padding.

Figure 5:
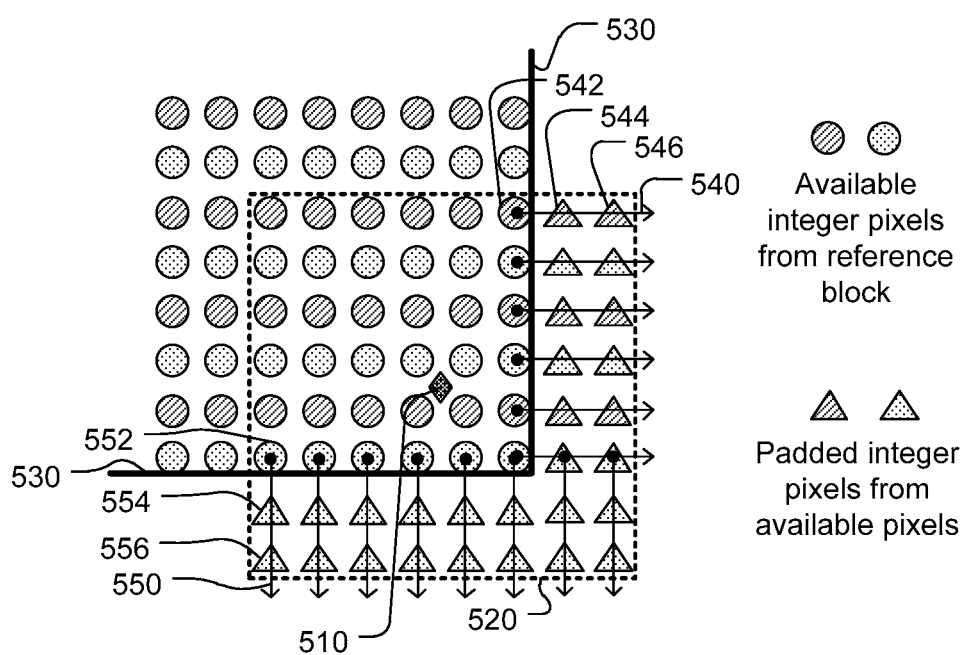
FIG. 5 illustrates an example of padding an unavailable area for fractional pixel interpolation by horizontally extending the rightmost column first and then vertically extending the bottommost row.

FIG. 5 illustrates an example of padding an unavailable area for fractional pixel interpolation by horizontally extending the rightmost column first and then vertically extending the very bottom row. The sub-pel reference pixel 510 to be interpolated is shown as a diamond-shaped symbol in FIG. 5. The neighboring reference pixels required for interpolation are enclosed by the dash-line box 520, which include 4 pixels on each side (left, right, up and down). The thick-line boundary 530 indicates the boundary between available and unavailable reference pixels, where the available reference pixels are on the upper-left side of the boundary. As shown in FIG. 5, some of the reference pixels for interpolation are not available and are indicated by triangle symbols. In order to pad these unavailable reference pixels, the available reference pixels in the rightmost column (e.g., pixel 542) is extended to the right as indicated by arrows 540 to generate the unavailable reference pixels (e.g., pixels 544 and 546). After horizontal extension is performed, the vertical extension is performed. The available reference pixels in the bottommost row (e.g., pixel 552) are extended downward as indicated by arrows 550 to generate the unavailable reference pixels (e.g., pixels 554 and 556). In FIG. 5, L is equal to 4, and M(x) and M(y) are equal to 2, where the number of horizontal padding of (L−M(x)) unavailable columns is equal to 2, and the number of vertical padding of (L−M(y)) unavailable rows is equal to 2. While the example in FIG. 5 illustrates a case of horizontal extension first followed by vertical extension, the order can be swapped as well.

Method 3. Padding the Unavailable Pixels with Default or Predefined Values

According to this method, the unavailable pixels are padded using default or predefined values. In one embodiment, the whole current picture is initialized as a fixed value X. For example, X can be set to $(1<<\text{bit\_depth})>>1$, where bit_depth represents the bit depth of a pixel. In the above example, X is set to half of the maximum level, such as X=128 for bit_depth=8. In another example, X is set to 0. In yet another example, X can be a preset value that is signaled at a CU, CTU, slice/picture or sequence level. Alternatively, X can be derived at a CU, CTU, slice/picture or sequence level.

In yet another embodiment, the current CTU or CU is initialized as a fixed value X. For example, X can be set to $(1<<\text{bit\_depth})>>1$, where bit depth is the bit depth of a pixel. In the above example, X is set to half of the maximum level, such as X=128 for bit_depth=8. In another example, X is set to 0. In yet another example, X can be a preset value that is signaled at a CU, CTU, slice/picture or sequence level. Alternatively, X can be derived at a CU, CTU, slice/picture or sequence level.

Method 4. Restricting Integer Chroma BV for Integer Luma BV in Non-4:4:4 Format

According to this method, for non 4:4:4 color formats, if the luma block vector is in integer accuracy, the corresponding chroma vector is kept in integer accuracy. Therefore, when the chroma BV is derived from the luma BV by scaling, the chroma BV is always converted to an integer position. Therefore, no interpolation is needed for both luma and chroma components if the luma block vector is in integer accuracy. In one embodiment, the chroma BV is converted by rounding the chroma vector component to its nearest integer for both x and y components. For example, a derived chroma BV component with a value of 3.6 will be rounded to 4. A derived chroma BV component with a value of −3.6 will be rounded to −4. In another embodiment, for both components, the derived chroma vector component is clipped to its nearest integer smaller than or equal to its value. For example, a derived chroma BV component with a value of 3.6 will be rounded to 3. A derived chroma BV component with a value of −3.6 will be clipped to −4. In yet another embodiment, for both components, the chroma vector component is clipped to its nearest integer larger than or equal to the derived chroma BV value. For example, 3.6 will be clipped to 4. A derived chroma BV component with a value of −3.6 will be clipped to −3. For all the above operations, when chroma vector uses ⅛-pel accuracy, these integers are left shifted to match the integer positions. For example, value 1 is represented by $(1<<3)=8$ in ⅛-pel accuracy.

Method 5. Constraining Encoder to Ensure the Availability of Reference Pixels

In order to perform pixel interpolation, the neighboring pixels of the reference block should be available. According to this method, encoder constraints are imposed to make sure the availability of those pixels for interpolation.

Embodiment 1. According to this embodiment, the following bitstream conformance conditions are applied to the block vector. It is a requirement of bitstream conformance that when the reference picture is the current picture, the luma motion vector mvLX shall comply with the following constraints:

When the derivation process for z-scan order block availability as specified in subclause 6.4.1 of JCTVC-T1005 (Joshi, et al., *HEVC Screen Content Coding Draft Text 3*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1005) is invoked with (xCurr, yCurr) set equal to (xCb, yCb) and the neighboring luma location (xNbY, yNbY) set equal to (xPb+(mvLX[0]>>2), (yPb+mvLX[1]>>2)) as inputs, the output shall be equal to TRUE, (15)

When the derivation process for z-scan order block availability as specified in subclause 6.4.1 of JCTVC-T1005 is invoked with (xCurr, yCurr) set equal to (xCb, yCb) and the neighbouring luma location (xNbY, yNbY) set equal to (xPb+(mvLX[0]>>2)+nPbW−1+(L−1), yPb+(mvLX[1]>>2)+nPbH−1+(L−1)) as inputs, the output shall be equal to TRUE. (16)

In the above constraints, the mvLX[0] and mvLX[1] are the two components of a block vector at quarter-pel resolution. (xPb, yPb) is the top-left luma sample location of the current prediction block. (xCb, yCb) is the top-left luma sample location of the current coding block. nPbW and nPbH are the width and height of the current luma prediction block. The interpolation filter length is 2L. For example, L can be set to the same value as JCTVC-T1005 (i.e., L=4 for the luma interpolation filter and L=2 for the chroma interpolation filter).

The subclause 6.4.1 of JCTVC-T1005 discloses a process to check the availability of z-scan order reference block. If the process returns "TRUE", it indicates that the z-scan order reference block is available. Otherwise, the z-scan order reference block is not available.

Compared to the constraints specified in subclause 6.4.1 of JCTVC-T1005, the available reference pixel boundaries according to the above embodiment are shifted by (L−1) pixels in the vertical direction and shifted by (L−1) pixels in the horizontal direction. The available reference pixel boundaries according to the above embodiment are shifted in vertical and horizontal directions by a number of pixels to ensure that the integer-pel pixels used for interpolating or generating sub-pel pixels are available (i.e., reconstructed).

If the interpolation filter is symmetric, the number of pixels that the available reference pixel boundary needs to be shifted (up in vertical direction and left in horizontal direction) according to the above embodiment should be at least equal to half of the number of filter taps.

Embodiment 2. According to this embodiment, the following bitstream conformance conditions are applied to the block vector. It is a requirement of bitstream conformance that when the reference picture is the current picture, the luma motion vector mvLX shall comply with the following constraints:

When the derivation process for z-scan order block availability as specified in subclause 6.4.1 of JCTVC-T1005 is invoked with (xCurr, yCurr) set equal to (xCb, yCb) and the neighbouring luma location (xNbY, yNbY) set equal to (xPb+(mvLX[0]>>2), (yPb+mvLX[1]>>2)) as inputs, the output shall be equal to TRUE. (17)

When the derivation process for z-scan order block availability as specified in subclause 6.4.1 of JCTVC-T1005 is invoked with (xCurr, yCurr) set equal to (xCb, yCb) and the neighbouring luma location (xNbY, yNbY) set equal to (xPb+(mvLX[0]>>2)+nPbW−1+L, yPb+(mvLX[1]>>2)+nPbH−1+L) as inputs, the output shall be equal to TRUE. (18)

Compared to the constraints specified in subclause 6.4.1 of JCTVC-T1005, the available reference pixel boundaries according to the above embodiment are shifted by L pixels in the vertical direction and shifted by L pixels in the horizontal direction. Again, the available reference pixel boundaries according to the above embodiment are shifted in vertical and horizontal directions by a number of pixels to ensure that the integer-pel pixels used for interpolating or generating sub-pel pixels are available (i.e., reconstructed).

Embodiment 3. According to this embodiment, the following bitstream conformance conditions are applied to the block vector. It is a requirement of bitstream conformance that when the reference picture is the current picture, the luma motion vector mvLX shall comply with the following constraints:

When the derivation process for z-scan order block availability as specified in 6.4.1 of JCTVC-T1005 is invoked with (xCurr, yCurr) set equal to (xCb, yCb) and the neighbouring luma location (xNbY, yNbY) set equal to (xPb+(mvLX[0]>>2), (yPb+mvLX[1]>>2)) as inputs, the output shall be equal to TRUE. (19)

When the derivation process for z-scan order block availability as specified in subclause 6.4.1 of JCTVC-T1005 is invoked with (xCurr, yCurr) set equal to (xCb, yCb and the neighbouring luma location (xNbY, yNbY) set equal to (xPb+(mvLX[0]>>2)+nPbW−1+(L+m), yPb+(mvLX[1]>>2)+nPbH−1+(L+m)) as inputs, the output shall be equal to TRUE. (20)

Compared to the constraints specified in subclause 6.4.1 of JCTVC-T1005, the available reference pixel boundaries according to the above embodiment are shifted by (L+m) pixels in the vertical direction and shifted by (L+m) pixels in the horizontal direction. The available reference pixel boundaries according to the above embodiment are shifted in vertical and horizontal directions by a number of pixels to ensure that the integer-pel pixels used for interpolating or generating sub-pel pixels are available (i.e., reconstructed).

Method 6. Constraining Encoder to Ensure the Availability of Reference Pixels for Non-4:4;4 Chroma Interpolation When the block vectors always choose integer resolution, the luma pixels do not need interpolation. However, for chroma pixels in non-4:4:4 color formats, luma block vector needs to be scaled to derive chroma block vector. Sometimes the chroma block vector after scaling points to sub-pel positions and interpolation is needed.

In order to perform chroma pixel interpolation, the neighboring pixels of the reference block should be available. In the following, some encoder constraints are imposed to make sure the availability of those pixels.

Embodiment 1. According to this embodiment, the following bitstream conformance conditions are applied to the block vector. It is a requirement of bitstream conformance that when the reference picture is the current picture, the luma motion vector mvLX shall comply with the following constraints:

When the derivation process for z-scan order block availability as specified in subclause 6.4.1 of JCTVC-T1005 is invoked with (xCurr, yCurr) set equal to (xCb, yCb) and the neighbouring luma location (xNbY, yNbY) set equal to (xPb+(mvLX[0]>>2), (yPb+mvLX[1]>>2)) as inputs, the output shall be equal to TRUE. (21)

When the derivation process for z-scan order block availability as specified in subclause 6.4.1 of JCTVC-T1005 is invoked with (xCurr, yCurr) set equal to (xCb, yCb) and the neighbouring luma location (xNbY, yNbY) set equal to (xPb+(mvLX[0]>>2)+nPbW−1+(L−1)*2*(subWidthC−1), yPb+(mvLX[1]>>2)+nPbH−1+(L−1)* 2*(subHeightC−1)) as inputs, the output shall be equal to TRUE. (22)

In the above equations, subHeightC and subWidthC are variables related to chroma format as defined in HEVC SCC. The subWidthC and subHeightC values are derived from chroma_format_idc and separate_colour_plane_flag as shown in Table 2.

Embodiment 2. According to this embodiment, the following bitstream conformance conditions are applied to the block vector. It is a requirement of bitstream conformance that when the reference picture is the current picture, the luma motion vector mvLX shall comply with the following constraints:

When the derivation process for z-scan order block availability as specified in subclause 6.4.1 of JCTVC-T1005 is invoked with (xCurr, yCurr) set equal to (xCb, yCb) and the neighbouring luma location (xNbY, yNbY) set equal to (xPb+mvLX[0]>>2), (yPb+mvLX[1]>>2)) as inputs, the output shall be equal to TRUE. (23)

When the derivation process for z-scan order block availability as specified in subclause 6.4.1 of JCTVC-T1005 is invoked with (xCurr, yCurr) set equal to (xCb, yCb) and the neighboring luma location (xNbY, yNbY) set equal to (xPb+(mvLX[0]>>2)+nPbW−1+L*2*(subWidthC−1), yPb+(mvLX[1]>>2)+nPbH−1+L*2*(subHeightC−1)) as inputs, the output shall be equal to TRUE. (24)

Embodiment 3. According to this embodiment, the following bitstream conformance conditions are applied to the block vector. It is a requirement of bitstream conformance that when the reference picture is the current picture, the luma motion vector mvLX shall comply with the following constraints:

When the derivation process for z-scan order block availability as specified in subclause 6.4.1 of JCTVC-T1005 is invoked with (xCurr, yCurr) set equal to (xCb, yCb) and the neighbouring luma location (xNbY, yNbY) set equal to (xPb+(mvLX[0]>>2), (yPb+mvLX[1]>>2)) as inputs, the output shall be equal to TRUE. (25)

When the derivation process for z-scan order block availability as specified in subclause 6.4.1 of JCTVC-T1005 is invoked with (xCurr, yCurr) set equal to (xCb, yCb) and the neighbouring luma location (xNbY, yNbY) set equal to (xPb+(mvLX[0]>>2)+nPbW−1+(L+m)*2*(subWidthC−1), yPh+(mvLX[1]>>2)++(L+m)*2*(subHeightC−1)) as inputs, the output shall be equal to TRUE. (26)

Method 7. Interpolation in Monochrome Color Format

When the block vector is always integer, and the color format is monochrome (only luminance component), there is no need to apply padding of unavailable pixels. In one embodiment, when a constant value A is used to initialize the current decoded picture as shown by the pseudo codes in Table 3, where Rec_Pixel[i, j] is the reconstructed pixel at location (i, j) of current picture.

TABLE 3

```
If (chroma_format_idc != 3 && chroma_format_idc !=0)
{
   for (i = 0; i< pic_width_in_luma_samples / SubWidthC ; i++)
      for (j = 0; j< pic_height_in_luma_samples / SubHeightC ; j++)
      {
         Rec_Pixel[i, j] = A;
      }
}
```

Chroma Interpolation in Non-4:4:4 Formats Using Padded Pixel Values

When the block vectors always choose integer resolution, the luma pixels do not need interpolation. However, for chroma pixels in non-4:4:4 color formats, luma block vector needs to be scaled to derive chroma block vector. Sometimes the chroma block vector after scaling points to sub-pel positions and interpolation is needed. In order to perform chroma pixel interpolation, the neighboring pixels of the reference block should be available. When the reference block is in a location near the boundary of the reference area, some of the neighboring pixels may not available. In the following, the unavailable pixels are padded using valid pixel values. One example is shown as follows.

When an unavailable pixel (x, y) is outside of the picture boundary, the available pixel at the picture boundary is used to pad this unavailable pixel.

If x is outside picture boundary but y is inside, pixel at (x0, y) is used pad this unavailable pixel, where x0 is closest position to x that is inside the picture.

If y is outside picture boundary but x is inside, pixel at (x, y0) is used pad this unavailable pixel, where y0 is closest position toy that is inside the picture.

If both x and y are outside picture boundary, pixel at (x0, y0) is used pad this unavailable pixel, where (x0, y0) is closest position to (x, y) that is inside the picture.

When an unavailable pixel is outside the reference area but inside the picture, a constant value is used to pad this unavailable pixel. In one embodiment, the value 0 is used; in another embodiment, the value (1<<bit_depth)>>1 is used, where bit_depth is the bit depth of a pixel. When bit_depth is 8, the value used in padding is 128.

Another example is shown as follows:

The entire current picture is initialized using a constant value. In one embodiment, the value 0 is used; in another embodiment, the value (1<<bit_depth)>>1 is used, where bit_depth is the bit depth of a pixel. When bit_depth is 8, the value used in padding is 128.

During the decoding process of the current picture, the reconstructed pixels gradually fill the current picture block by block, to replace those constant values.

For a block vector pointing to picture boundary, the following rules are applied to pad the unavailable pixel using pixels at picture boundary:

$$xB_{i,j}=\text{Clip3}(0,(\text{pic\_width\_in\_luma\_samples}/\text{SubWidth}C)-1,x\text{Int}_C+i) \quad (27)$$

$$yB_{i,j}=\text{Clip3}(0,(\text{pic\_height\_in\_luma\_samples}/\text{SubHeight}C)-1,y\text{Int}_C+j) \quad (28)$$

In the above equations, pic_width_in_luma_samples and pic_height_in_luma_samples are the width and height of the picture, respectively. SubWidthC and SubHeightC are defined in Table 2. $x\text{Int}_C$ and $y\text{Int}_C$ are the top-left integer position of the top-left pixel of the reference block. i and j are the indices going through the two dimensions of the reference block by the block width and height, respectively.

Adaptive Motion/Block Vector Resolution Handling

Another aspect of the present invention addresses issues relate adaptive motion/block vector resolution. In JCTVC-T1014 (Joshi, et al., *Screen content coding test model 4 (SCM 4)*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1014), the decoding process for the motion vector is described as follows.

If the integer motion vector resolution is enabled (i.e., use_integer_mv_flag_equal to 1) in the current slice, the decoded motion vector is treated as an integer motion vector and stored at integer resolution. During deblocking filter process, the motion vector is at integer resolution. During interpolation process, the motion vector is left shifted by two, to avoid fractional-pel compensation.

If the integer motion vector resolution is disabled (i.e., use_integer_mv_flag is equal to 0) in the current slice, the decoded motion vector is treated as a fractional-pel motion vector and stored as fractional-pel resolution. During deblocking and interpolation processes, no extra operation is needed.

The decoding process for the block vector according to JCTVC-T1014 is described as follows.

The decoded block vector is always treated as the integer block vector. However, it is stored at fractional-pel resolution by left shifting by two after decoding. During the process of deblocking filter and interpolation filter, the block vector is at fractional-pel resolution, no extra operation is needed.

Embodiment 1. According to this embodiment, the decoding process of adaptive resolution for the motion vector and the block vector is modified as follows.

When the integer motion vector resolution is enabled (i.e., use_integer_mv_flag_equal to 1), both the block vector and motion vector are decoded at integer resolution. Also, both the block vector and motion vector are stored at fractional-pel resolution such as quarter-pel resolution. This is done by left shifting the decoded block vector or motion vector by N, a positive integer number, such as N=2.

The block vector predictor and motion vector predictor used are at integer resolution. This is done by right shifting the vector predictor by N, a positive integer number, such as N=2.

When the integer motion vector resolution is disabled (i.e., use_integer_mv_flag_equal to 0), both block vector and motion vector are decoded at fractional-pel resolution. Also, both block vector and motion vector are stored at fractional-pel resolution, such as quarter-pel resolution.

The block vector predictor and motion vector predictor used are at fractional-pel resolution, such as quarter-pel resolution.

Embodiment 2. According to this embodiment, the decoding process of adaptive resolution for the motion vector and the block vector is modified as follows.

When the integer motion vector resolution is enabled (i.e., use_integer_mv_flag_equal to 1), both block vector and motion vector are decoded at integer resolution. Also, both block vector and motion vector are stored at integer-pel resolution. When used by the deblocking filter as inputs, the block vector and motion vectors are modified to be at fractional-pel resolution, such as quarter-pel resolution. This is done by left shifting the decoded block vector or motion vector by N, a positive integer number, such as N=2.

When the integer motion vector resolution is disabled (use_integer_mv_flag is equal to 0), both block vector and motion vector are decoded at fractional-pel resolution. And both block vector and motion vector are stored at fractional-pel resolution, such as quarter-pel resolution. No further modification is needed when the block vector and motion vector are used by deblocking filter as inputs.

High Level Syntax for IntraBC

One aspect of the present invention is high level syntax for IntraBC. According to embodiments of this invention, the current picture is placed at the last position of the reference picture list. In the following embodiments, List 0 is used as an example. Similar changes can be applied to List 1 if the current picture is placed in List 1 as a reference picture.

Embodiment 1. According to this embodiment, after the initialization, the entry with index value equal to num_ref_idx_l0_active_minus1 in the array RefPicListTemp0 is set to the current picture. Exemplary pseudo codes for implementing this embodiment are shown in Table 4. The variable NumRpsCurrTempList0 is set equal to Max (num_ref_idx_l0_active_minus1+1, NumPicTotalCurr) is constructed as shown in Table 4.

TABLE 4

```
rIdx = 0
while( rIdx < NumRpsCurrTempList0 ) {
   for( i = 0; i < NumPocStCurrBefore && rIdx < NumRpsCurrTempList0;
rIdx++, i++ )
      RefPicListTemp0[ rIdx ] = RefPicSetStCurrBefore[ i ]
   for( i = 0; i < NumPocStCurrAfter && rIdx < NumRpsCurrTempList0;
rIdx++, i++ ) (8-8)
      RefPicListTemp0[ rIdx ] = RefPicSetStCurrAfter[ i ]
   for( i = 0; i < NumPocLtCurr && rIdx < NumRpsCurrTempList0;
rIdx++, i++ )
      RefPicListTemp0[ rIdx ] = RefPicSetLtCurr[ i ]
   if( curr_pic_as_ref_enabled_flag )
      RefPicListTemp0[ rIdx++ ] = currPic
}
if( curr_pic_as_ref_enabled_flag && num_ref_idx_l0_active_minus1 > 0 )
   RefPicListTemp0[ num_ref_idx_l0_active_minus1] = currPic
```

The list RefPicList0 is constructed as follows:

```
for( rIdx = 0; rIdx <= num_ref_idx_l0_active_minus1; rIdx++)
   RefPicList0[ rIdx ] = ref_pic_list_modification_flag_l0 ?
      RefPicListTemp0[ list_entry_l0[ rIdx ] ] : RefPicListTemp0[ rIdx ]
```

Embodiment 2. According to thus embodiment, after the initialization, the entry with index value equal to num_ref_idx_l0_active_minus1 in the array RefPicListTemp0 is swapped with the entry in the array that stores the current picture. Exemplary pseudo codes for implementing this embodiment are shown in Table 5. The variable NumRpsCurrTempList0 is set equal to Max(num_ref_idx_l0_active_minus1+1, NumPicTotalCurr) and the list RefPicListTemp0 are constructed as shown in Table 5.

TABLE 5

```
rIdx = 0
while( rIdx < NumRpsCurrTempList0 ) {
   for( i = 0; i < NumPocStCurrBefore && rIdx < NumRpsCurrTempList0;
rIdx++, i++ )
      RefPicListTemp0[ rIdx ] = RefPicSetStCurrBefore[ i ]
   for( i = 0; i < NumPocStCurrAfter && rIdx < NumRpsCurrTempList0;
rIdx++, i++ ) (8-8)
      RefPicListTemp0[ rIdx ] = RefPicSetStCurrAfter[ i ]
   for( i = 0; i < NumPocLtCurr && rIdx < NumRpsCurrTempList0;
rIdx++, i++ )
      RefPicListTemp0[ rIdx ] = RefPicSetLtCurr[ i ]
   if( curr_pic_as_ref_enabled_flag )
      RefPicListTemp0[ rIdx++ ] = currPic
}
if( curr_pic_as_ref_enabled_flag && rIdx - 1 > num_ref_idx_l0_active_
minus1 && num_ref_idx_l0_active_minus1 > 0 ) {
   RefPicListTemp0[ rIdx - 1 ] =
RefPicListTemp0[ num_ref_idx_l0_active_minus1]
   RefPicListTemp0[ num_ref_idx_l0_active_minus1] = currPic
}
```

The list RefPicList0 is constructed in the same as that in the Embodiment 1.

Embodiment 3. According to this embodiment, after the initialization, the current picture is inserted into the entry with index value equal to num_ref_idx_l0_active_minus1 in the array RefPicListTemp0. The variable NumRpsCurrTempList0 is set equal to Max(num_ref_idx_l0_active_minus1+1, NumPicTotalCurr) and the list RefPicListTemp0 are constructed as shown in Table 6.

TABLE 6

```
rIdx = 0
while( rIdx < NumRpsCurrTempList0 ) {
   for( i = 0; i < NumPocStCurrBefore && rIdx < NumRpsCurrTempList0;
rIdx++, i++ )
      RefPicListTemp0[ rIdx ] = RefPicSetStCurrBefore[ i ]
   for( i = 0; i < NumPocStCurrAfter && rIdx < NumRpsCurrTempList0;
rIdx++, i++ ) (8-8)
      RefPicListTemp0[ rIdx ] = RefPicSetStCurrAfter[ i ]
   for( i = 0; i < NumPocLtCurr && rIdx < NumRpsCurrTempList0;
rIdx++, i++ )
      RefPicListTemp0[ rIdx ] = RefPicSetLtCurr[ i ]
   if( curr_pic_as_ref_enabled_flag )
      RefPicListTemp0[ rIdx++ ] = currPic
}
if( curr_pic_as_ref_enabled_flag && rIdx - 1 > num_ref_idx_l0_active_
minus1 && num_ref_idx_l0_active_minus1 > 0 ) {
   for( i = num_ref_idx_l0_active_minus1 + 1; i < rIdx; i++ )
      RefPicListTemp0[ i ] = RefPicListTemp0[ i - 1]
   RefPicListTemp0[ num_ref_idx_l0_active_minus1] = currPic
}
```

The list RefPicList0 is constructed in the same as that in the Embodiment 1.

Figure 6:
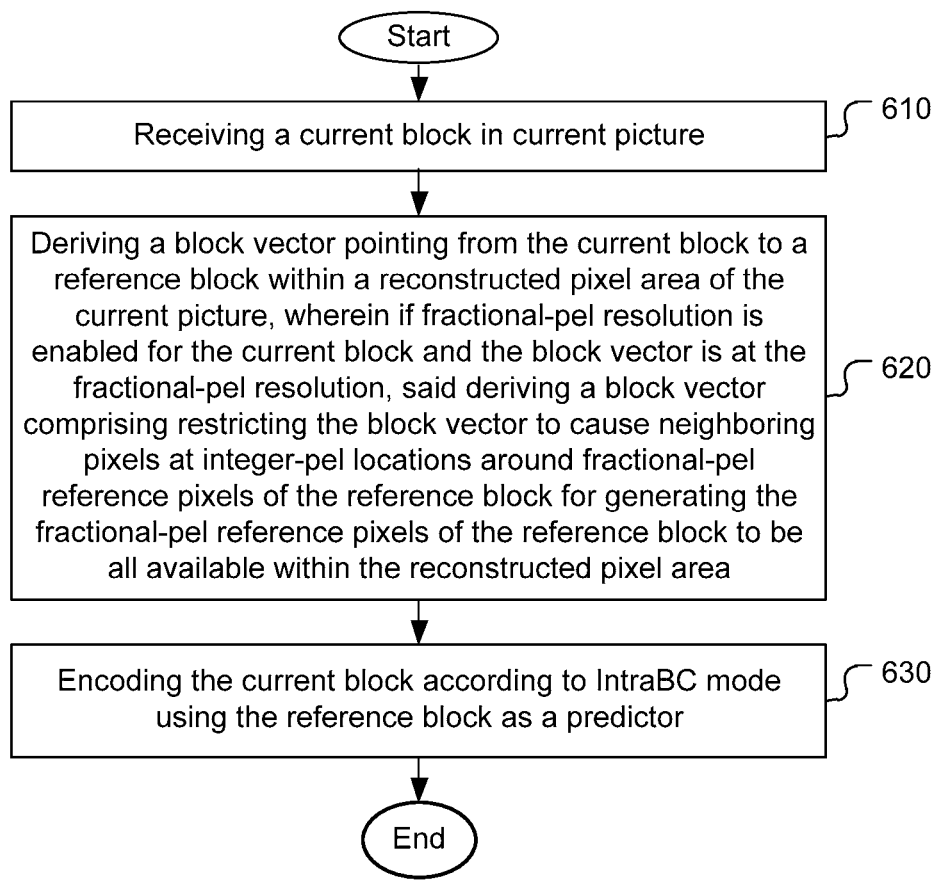
FIG. 6 illustrates an exemplary flowchart of a video encoder for IntraBC (Intra-block copy mode) coding incorporating an embodiment of the present invention.

FIG. 6 illustrates an exemplary flowchart of a video encoder for IntraBC (Intra-block copy mode) coding incorporating an embodiment of the present invention. The system receives a current block in current picture in step 610. A block vector pointing from the current block to a reference block within a reconstructed pixel area of the current picture is derived as shown in step 620. If fractional-pel resolution is enabled for the current block and the block vector is at the fractional-pel resolution, the block vector is restricted so that neighboring pixels at integer-pel locations around fractional-pel reference pixels of the reference block for generating the fractional-pel reference pixels of the reference block to be all available within the reconstructed pixel area. The current block is encoded according to IntraBC mode using the reference block as a predictor in step 630.

Figure 7:
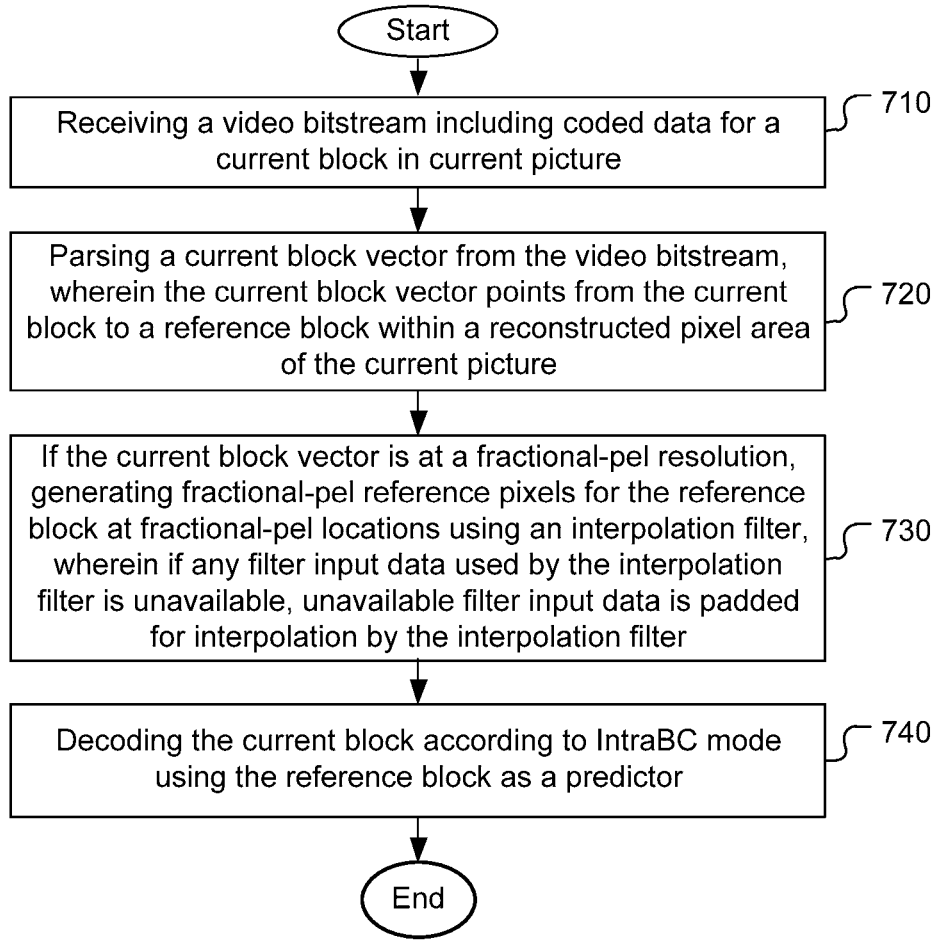
FIG. 7 illustrates an exemplary flowchart of video decoding using IntraBC mode (Intra-block copy mode) coding for a picture incorporating an embodiment of the present invention.

FIG. 7 illustrates an exemplary flowchart of video decoding using IntraBC mode (Intra-block copy mode) coding for a picture incorporating an embodiment of the present invention. The system receives a video bitstream including coded data for a current block in current picture in step 710. A current block vector is parsed from the video bitstream in step 720. The current block vector points from the current block to a reference block within a reconstructed pixel area of the current picture. If the current block vector is at a fractional-pel resolution, fractional-pel reference pixels are generated for the reference block at fractional-pel locations using an interpolation filter as shown in step 730. If any filter input data used by the interpolation filter is unavailable, unavailable filter input data is padded for interpolation by the interpolation filter. The current block is decoded according to IntraBC mode using the reference block as a predictor in step 740.

The flowcharts shown are intended to illustrate an example of IntraBC coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding using IntraBC mode (Intra-block copy mode) coding for a current picture, comprising:

receiving a current block in the current picture;

deriving a block vector pointing from the current block to a reference block within a reconstructed pixel area of the current picture, wherein if fractional-pel resolution is enabled for the current block and the block vector is at the fractional-pel resolution, said deriving a block vector comprising restricting the block vector to cause neighboring pixels at integer-pel locations around fractional-pel reference pixels of the reference block for generating the fractional-pel reference pixels of the reference block to be all available within the reconstructed pixel area, wherein the fractional-pel reference pixels of the reference block are generated from the neighboring pixels at integer-pel locations using an interpolation filter with 2L filter tap length, wherein L is a positive integer, and wherein whether the neighboring pixels at integer-pel locations around fractional-pel reference pixels of the reference block for generating the fractional-pel reference pixels of the reference block are all available within the reconstructed pixel area are determined according to if one or more conditions associated with the block vector and one or more coding parameters are satisfied, and wherein the current block corresponds to a PU (prediction unit), and said one or more coding parameters comprise PU width represented by nPbSw, PU height represented by nPbSh, location of a top-left pixel of the PU relative to the current picture represented by (xPb, yPb), location of a top-left pixel of a current CU (coding unit) relative to the current picture represented by (xCb, yCb), size of a CTU (coding tree unit) represented by CtbSize, and wherein the PU is within the current CU, and wherein said one or more conditions comprise $BV\_x + nPbSw + xPb - xCb + (L-1)*2*(\text{subWidthC}-1) <= 0$ or $BV\_y + nPbSh + yPb - yCb + (L-1)*2*(\text{subHeightC}-1) <= 0;$ and encoding the current block according to IntraBC mode using the reference block as a predictor.

2. The method of claim 1, wherein L is equal to 4 for a luma block and L is equal to 2 for a chroma block.

3. The method of claim 2, wherein said restricting the block vector shifts boundaries of the neighboring pixels at integer-pel locations available for generating the fractional-pel reference pixels of the reference block upward by at least (L−1) pixels and leftward by at least (L−1) pixels from boundaries of the reconstructed pixel area.

4. The method of claim 1, wherein said one or more conditions further comprise $$(xPb+BV\_x+nPbSw-1+(L-1)*2*(\text{subWidth}C-1))/\text{Ctb}\text{Size}-xCb/\text{Ctb}\text{Size}<=yCb/\text{Ctb}\text{Size}-(yPb+BV\_y+nPbSh-1+(L-1)*2*(\text{subHeight}C-1))/\text{Ctb}\text{Size}.$$

5. The method of claim 1, wherein the current block comprises a luma block and a chroma block for non-4:4:4 color video data, a luma block vector associated with the luma block is always at integer-pel resolution and a chroma block vector associated with the chroma block is scaled from the luma block vector, and said restricting the block vector is applied to the chroma block vector if the chroma block vector is at the fractional-pel resolution.

\* \* \* \* \*